Aug. 30, 1966 J. P. AIKEN 3,270,102
METHOD AND APPARATUS FOR THE PRODUCTION
OF HARDENED CLAY PRODUCTS
Filed Dec. 23, 1964 9 Sheets-Sheet 1
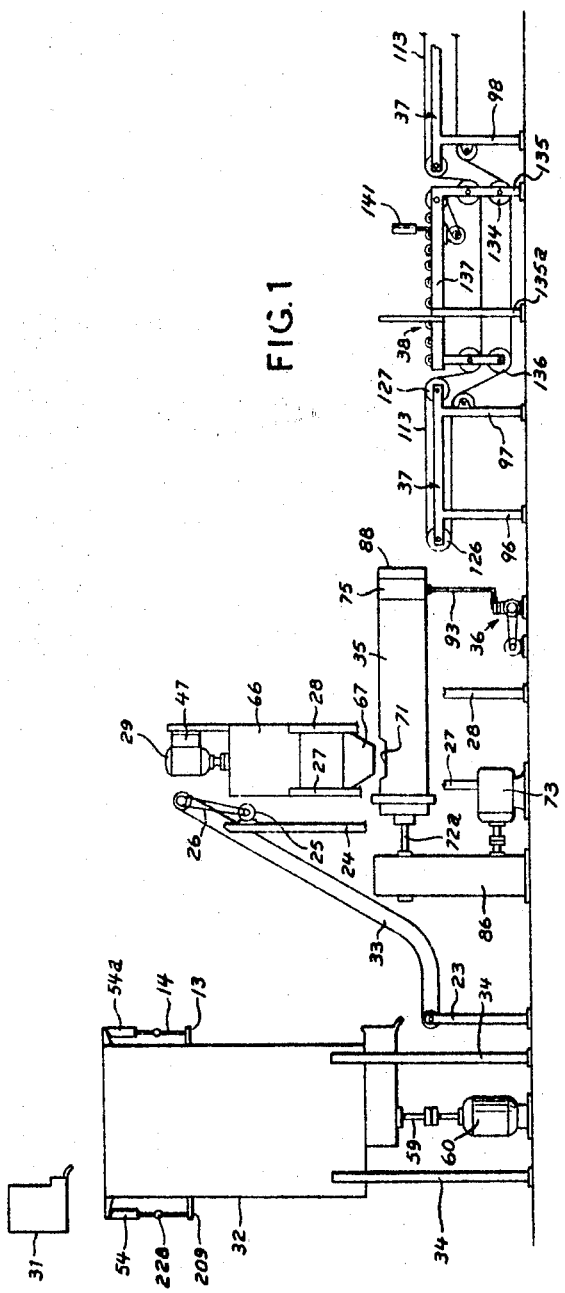
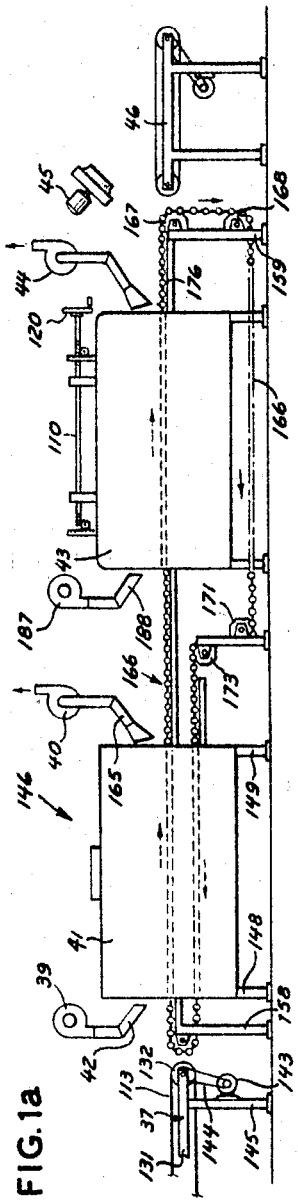
INVENTOR.
JOSEPH P. AIKEN
BY Maybee & Legris
ATTORNEYS Aug. 30, 1966  J. P. AIKEN  3,270,102
METHOD AND APPARATUS FOR THE PRODUCTION
OF HARDENED CLAY PRODUCTS
Filed Dec. 23, 1964  9 Sheets-Sheet 2

INVENTOR.
JOSEPH P. AIKEN
BY Maybee & Legris
ATTORNEYS

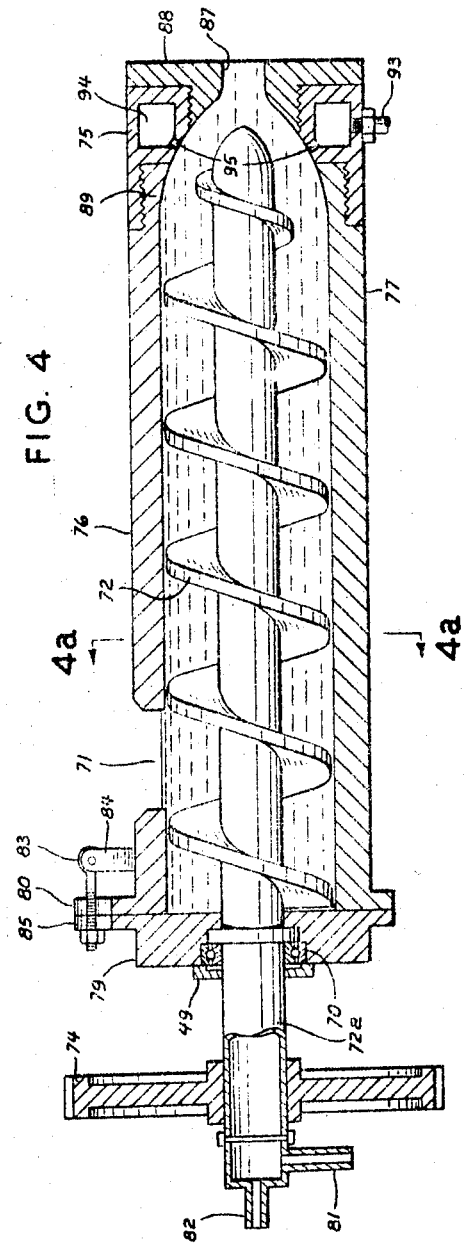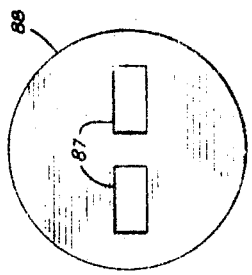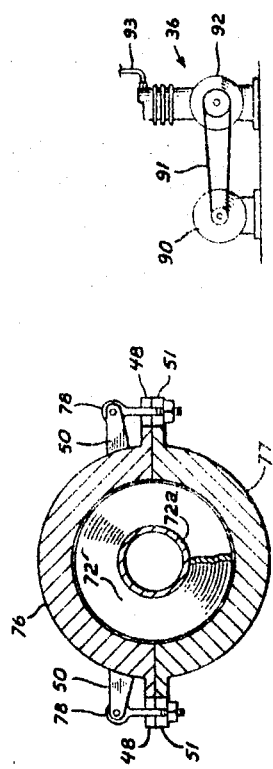

INVENTOR.
JOSEPH P. AIKEN
BY Maybee & Legris
ATTORNEYS

Aug. 30, 1966  J. P. AIKEN  3,270,102
METHOD AND APPARATUS FOR THE PRODUCTION
OF HARDENED CLAY PRODUCTS
Filed Dec. 23, 1964  9 Sheets-Sheet 6

INVENTOR.
JOSEPH P. AIKEN
BY Maybee & Legris
ATTORNEYS

Aug. 30, 1966    J. P. AIKEN    3,270,102
METHOD AND APPARATUS FOR THE PRODUCTION
OF HARDENED CLAY PRODUCTS
Filed Dec. 23, 1964    9 Sheets-Sheet 7
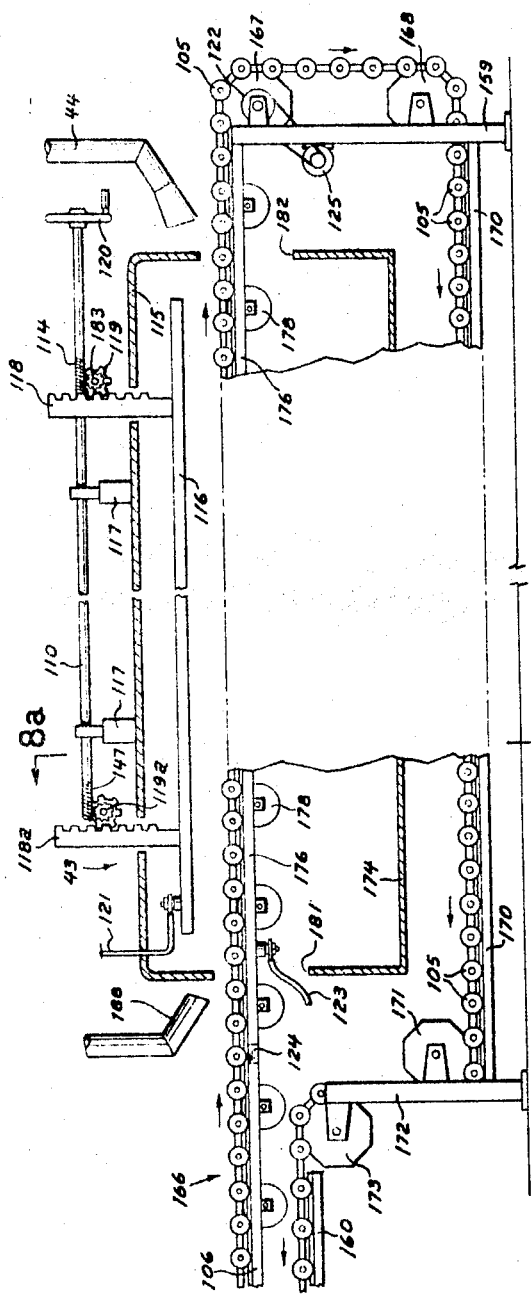
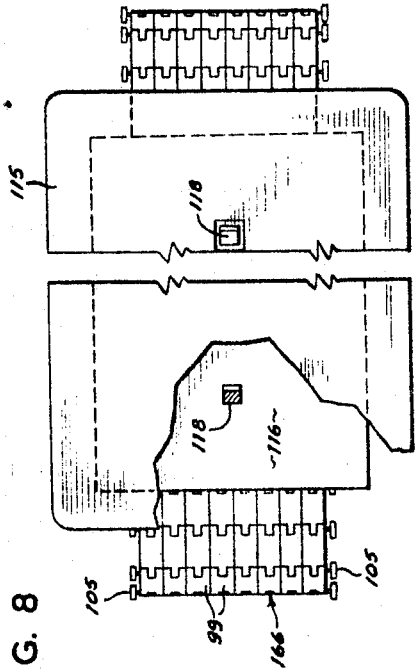
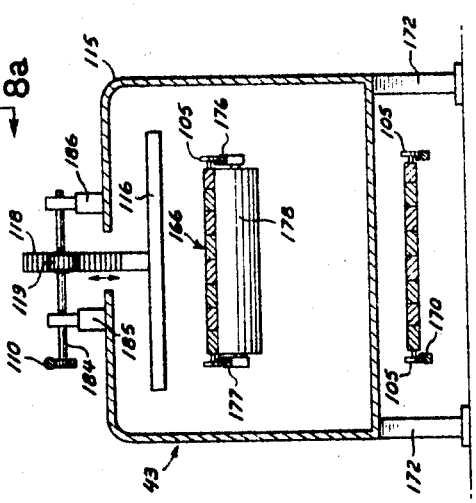
FIG. 8
FIG. 8b
FIG. 8a
INVENTOR.
JOSEPH P. AIKEN
BY Maybee & Legris
ATTORNEYS Aug. 30, 1966  J. P. AIKEN  3,270,102
METHOD AND APPARATUS FOR THE PRODUCTION
OF HARDENED CLAY PRODUCTS
Filed Dec. 23, 1964  9 Sheets-Sheet 8

INVENTOR.
JOSEPH P. AIKEN
BY Mayber & Legris
ATTORNEYS

INVENTOR.
JOSEPH P. AIKEN
BY Maybee & Legris
ATTORNEYS

United States Patent Office 3,270,102
Patented August 30, 1966

3,270,102
METHOD AND APPARATUS FOR THE PRODUCTION OF HARDENED CLAY PRODUCTS
Joseph Phillip Aiken, Toronto, Ontario, Canada, assignor to Ken-Mar Clay Products Limited, Toronto, Ontario, Canada, a company of Canada
Filed Dec. 23, 1964, Ser. No. 420,643
18 Claims. (Cl. 264—27)

The present application is a continuation-in-part of my co-pending application Serial No. 249,915, filed January 7, 1963.

This invention relates to improvements in the production of hardened clay products and more particularly to a novel system for producing hardened clay products involving continuous mixing, forming, drying and dielectric heating which results in formation of a baked clay product with a high degree of uniformity while reducing production time and attaining high efficiency in utilization of power.

A number of problems have continually beset the art associated with the forming and baking of clay products such as bricks and insulating materials. Thus, there has always been considerable difficulty in attaining a high degree of uniformity of color, texture and strength in the manufacture of bricks and similar building modules and clay insulating materials. Also, production of such clay products has been slowed down and made inefficient by the inability to turn out the baked clay items on a purely continuous, assembly line basis. Many of the operations have by their very nature been batchwise procedures, thereby preventing truly efficient and rapid procedures. Thus, the elimination of batchwise operated drying rooms and burning kilns would be a most desirable advance in the art of producing hardened clay products. These batchwise operations carried out by the prior art have meant a heavy demand on manpower. Utilization of a continuous assembly line procedure would substantially lessen these manpower requirements. Another problem which has beset the art of producing hardened clay products, such as bricks, has been the high percentage of rejects which must be discarded and/or returned in the process. Attempts have been continually made to reduce these losses due to imperfections in the finished product.

The novel system for producing hardened clay products of the present invention provides a continuously and uniformly operated procedure utilizing a combination of heated pressure extrusion of the clay mix, infra-red drying and preheating of the formed modules and high frequency dielectric heating to form the hardened clay product.

It is an object of the present invention to provide a novel method and apparatus for producing hardened clay products using a completely continuous and efficient procedure which eliminates batchwise apparatus, reduces production time, decreases manpower requirements and thereby increases product output and lowers production costs.

Another object of the invention is to provide a continuous procedure for manufacturing hardened clay products, which have a high degree of uniformity of color, texture and strength, while substantially reducing the number of rejects in the finished product.

Other objects and advantages will become apparent from the following description taken in conjunction with the accompanying drawings in which:

FIGURE 1 is a side elevational view of the rearward portion of a preferred form of apparatus embodying the invention, extending up to, and including a part of a conveyor for removing raw clay modules from a cutter mechanism;

FIGURE 1a is a continuation of FIGURE 1 showing a side elevational view of the forward portion of the preferred form of apparatus embodying the invention;

FIGURE 4 is a vertical longitudinal sectional view through the center of the extruder and the drive therefor;

FIGURE 4a is a vertical cross sectional view of the extruder through line 4a—4a of FIGURE 4;

FIGURE 4b depicts the de-airing unit for removal of excess air and moisture from the extruder;

FIGURE 4c is an end elevational view of the extruder die as seen from the right of FIGURE 4;

FIGURE 6a is a side elevational view of the rearward end of the link belt conveyor, showing in greater detail how the belt and its wheels travel about the end roller;

FIGURE 7a is a vertical cross-sectional view of the heater taken through line 7a—7a of FIGURE 7;

FIGURE 7b is a detailed sectional view, to a scale enlarged over FIGURE 7a, of one section of the walls of the infra-red heater showing the manner in which the heater units are mounted therein;

FIGURE 8 shows a broken vertical longitudinal sectional view through the dielectric heating unit and the contiguous portion of the link belt conveyor transferring the bricks thereto from the infra-red heater;

FIGURE 8a is a vertical transverse sectional view of the dielectric heater taken through line 8a—8a of FIGURE 8;

FIGURE 8b is a plan view of a portion of the dielectric heater, parts of the top being broken away to show the upper electrode within the housing;

Figure 2:
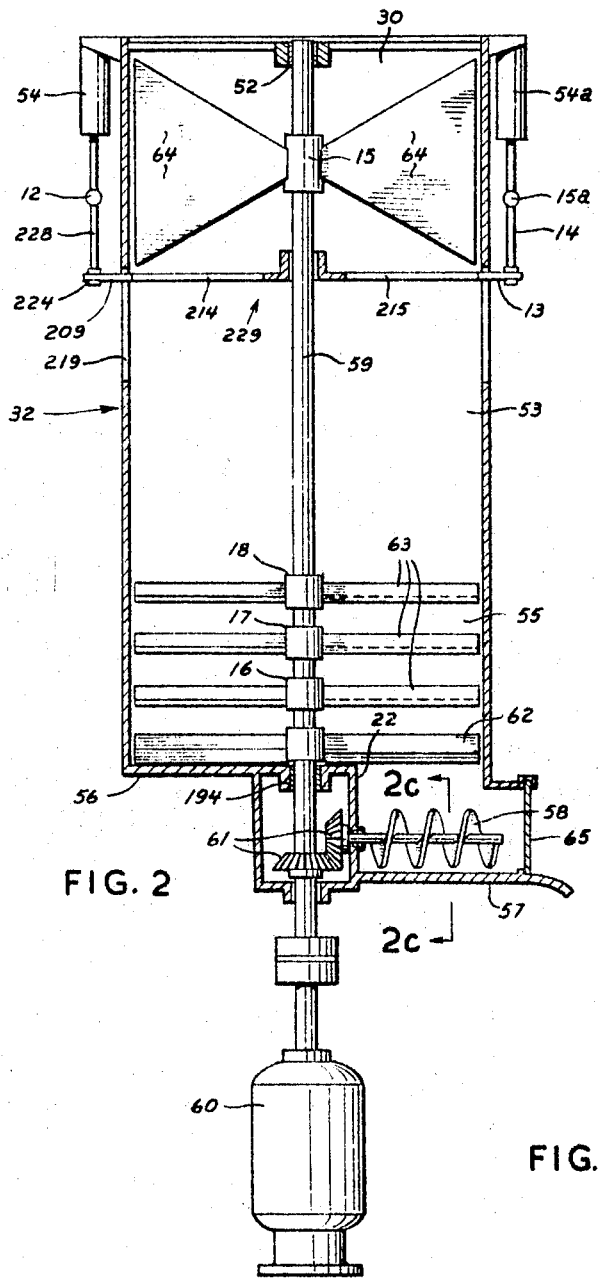
FIGURE 2 is a vertical sectional view, to an enlarged scale, of the power driven mixer and mechanism for expelling the mix to the extruder.

The present invention relates generally to a method and apparatus for producing hardened clay products, such as bricks, tiles and insulating materials. An intimate mixture of the ingredients of the clay products is delivered to a closed extruder which contains a means for heating the mix and from which the mix can be extruded under pressure through an extruder orifice. The extruded mix is fed through a cutter by which proper sized shapes are formed and the hot and partially dried shapes are then fed through an infra-red heater to complete the drying and preheat the modules and finally through a dielectric heater where the modules are rapidly and uniformly baked. The modules are carried in one pass through both the infra-red heater and dielectric heater on an endless electro-conductive conveyor belt which forms a bottom electrode in the dielectric heater. An upper electrode is mounted in the dielectric heater in spaced relationship from the conveyor belt and from any clay modules being carried on the belt. The upper electrode is mounted so as to be variably spaced from the lower electrode and a variable frequency oscillator circuit is connected to the upper and lower electrodes to form a high frequency dielectric heating circuit therewith. The circuit contains sensing means detecting changes in the modules or dielectric being carried on the belt and control means for changing the inductance of the dielectric circuit in response to changes in the dielectric.

Referring to the drawings, in which like parts are designated by the same reference numerals, and in particular to FIGURES 1 and 1a, the apparatus comprises a power-driven mixer 32, including a tank into the top of which clay, water and any coloring materials desired are deposited and in which the materials are thoroughly mixed and blended, then forced out at the bottom to a conveyor 33.

The conveyor 33 elevates the materials and deposits them into a hopper 66 from which they gravitate through a chute 67 into the open end of an extruder 35. The extruded mix, which has the cross section of the modules desired to be formed, e.g., bricks, is expelled from the extruder 35 to the rearward portion of a conveyor 37 by which they are conducted to and deposited upon a synchronously operating cutter 38 where the extruded form, or forms, are cut into standard lengths and then fed to the forward section of the conveyor 37.

The cut modules are next transferred by the conveyor 37 to a link belt conveyor 166 (see FIGURE 1a) whose horizontal upper pass traverses first the housing 41 of an infra-red heater and then the housing 43 of a dielectric heater. After leaving the dielectric heater, the completely cured modules, such as bricks or tiles, are deposited upon a forward conveyor 46 for cooling and eventual storage and sale.

The process is continuous and comparatively rapid and a plant with the arrangement shown in FIGURES 1 and 1a can be assembled to turn out 4,000 bricks, tiles, or other modules per hour at a cost materially reduced over conventional prior art procedures.

Referring more particularly to FIGURES 1 and 2, the mixer, or puddler and transfer unit 32 comprises a cylindrical metal casing supported on a frame or base, such as columns 34, FIGURE 1. A vertical shaft 59 is journaled at its upper end in a bearing 52 carried by the top or cover of the mixer 32, and at its lower end in a bearing 194, carried by bottom 56 of the mixer.

At a point somewhat less than one-third of the distance between the bearings 52 and 194 the shaft 59 passes through an opening in a fixed partition generally indicated at 229, and forming the bottom of an upper premixing chamber. The partition 229 is formed with openings, two of which are shown in FIGURE 2, and which may be square or rectangular in shape. Closure members 214 and 215 are provided for each opening. The member 214 may be operated, for example, by being mounted within its opening for clockwise pivoted movement about an axis adjacent the wall of the casing and normal to the plane of the figure. The closure 214 has a radially-slotted arm 209 integrally connected therewith and projecting outwardly through a slot 219 in the casing wall. The distal end of the arm has a sliding connection at 224, with piston rod 228 of a vertical hydraulic power cylinder 54 fixed with the wall of the mixer casing. Means generally indicated at 12 guide the rod for vertical reciprocation when fluid under pressure is admitted, under control of valve means (not shown) to one side or the other of the piston within the cylinder 54. In the positions of the parts shown, when pressure fluid is introduced beneath the piston, the rod 228 moves upwardly and the closure member 214 pivots clockwise, as viewed in FIGURE 2, from the first position shown to a second position substantially within the slot 219, so that the material within the mixing chamber may gravitate to the lower part of the mixer casing.

The partition or closure member 215 is controlled and operated in the manner just described for the member 214, so that it is sufficient to identify radially slotted arm 13, piston rod 14, guide 15a and hydraulic power cylinder 54a. It will be understood that the valve previously mentioned, but not shown, preferably controls both of the cylinders 54 and 54a, so that all closure members are simultaneously operated between their open and closed positions.

A plurality of paddles or mixing blades 64 are secured to a hub 15, in turn fixed on the shaft 59 so that, in response to actuation by motor 60, the materials charged into upper compartment 30 of the mixer 32 are thoroughly mixed and blended before being discharged into lower, final mixing compartment or tempering chamber 53 of the mixer 32. A color, or pigment, supply tank 31 (see FIGURE 1) is mounted by means not shown over the mixer casing. From the tank 31 carefully measured amounts of coloring material may be dispensed, if desired, into the compartment 30 to thereby assure a uniform coloring of the final product.

Figure 2A:
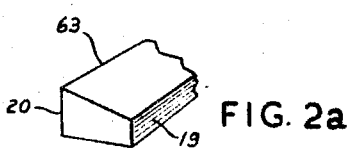
FIGURE 2a shows a perspective view to a further enlarged scale, of the distal end of one of the mixing blades above the base or scraper blades in the power driven mixer shown in FIGURE 2.

In lower portion 55 of the lower tank compartment 53 the shaft 59 has rigidly connected therewith a plurality of beater blades 63, which extend radially from respective, axially-spaced hubs 16, 17 and 18, each secured to the shaft 59. Referring to FIGURE 2a, which shows an enlarged perspective view of the distal end of one of the beater blades 63, it is noted that each of the blades 63 has the cross-sectional form of a right trapezoid with a leading edge 19 shorter than trailing edge 20 and has its sloping planar surface facing upwardly.

Figure 2B:
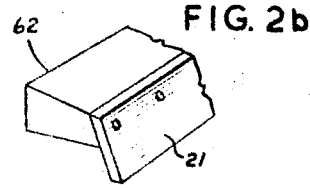
FIGURE 2b is a perspective view of the distal end of one of the base or scraper blades in the power driven mixer.

Lowermost scraper blade 62 has the same general cross-sectional form as the blades 63, but, in addition, is provided with a scraper element 21 fastened thereto (see FIGURE 2b) which resiliently or yieldingly engages the bottom surface 56 of the mixer 32 to assure that all material of each charge is thoroughly dispensed into the extruder, subsequently described.

Figure 2C:
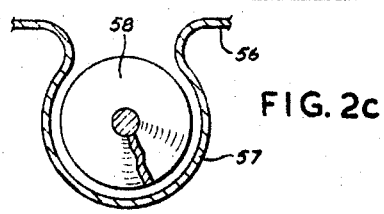
FIGURE 2c is a sectional view through line 2c—2c of FIGURE 2, showing the helical discharge screw for the mixer.

The bottom 56 of the mixer tank has a housing 57 attached thereto and the mixed material empties into this housing. As seen in FIGURE 2c, the housing 57 is of generally cylindrical form with a horizontal axis extending radially from the axis of the shaft 59. A worm-type discharge screw 58 is journaled centrally in the housing and is connected to be driven from the shaft 59, by bevel gearing 61 connected to the shaft 59 and the discharge screw 58. A partition 22 in and transversely across the housing 57 forms a closed chamber for protection of the gearing. The portion of the housing 57 containing the worm 58 has free and open communication with the lower compartment 55, so that the mixed ingredients gravitate into the housing 57 and are impelled outwardly past a trap door 65 hinged at its top edge to swing about a horizontal axis.

With closure members 214 and 215 closed, after a charge comprising carefully and closely measured amounts of clay, water and coloring materials has been deposited into the upper compartment 30, the motor 60 is energized and, after the materials have been blended by the blades 64, fluid under pressure is admitted to the cylinders 54, 54a, to thereby pivot the closure members 214 and 215 downwardly. The mix then gravitates to the lower compartment 55 where it is thoroughly mixed by the blades 63 and 62 and then finally gravitates into the housing 57 and is forced through the door 65 to the conveyor 33, FIGURE 1, which elevates the material and deposits it into the hopper 66 over the extruder. The conveyor 33 may be of any suitable type and is therefore not shown in detail apart from supports 23 and 24 and driving motor 25 for the conveyor mounted on the support 24 and connected to drive the top pulley of the conveyor 33 by means of a chain 26. Where conditions permit, of course, the conveyor 33 may be omitted by positioning the mixer 32 so that its outlet is directly over and above the hopper 66.

Figure 3:
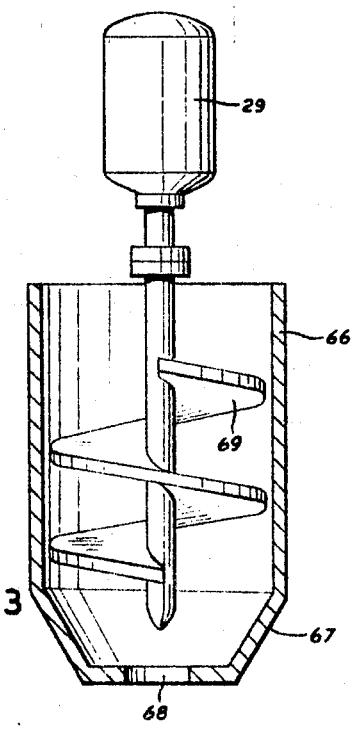
FIGURE 3 is a vertical sectional view through the center of the feeding device for transporting the mix to the extruder.

The hopper 66 is suitably supported, such as on four uprights, two of which, 27 and 28, are shown in FIGURE 1. The hopper 66 contains a helical impeller and mixer 69, FIGURE 3, mounted for rotation about a vertical axis. The impeller 69 is driven by a motor 29 having a vertical shaft and mounted by a bracket 47, FIGURE 1, at the top edge of the hopper 66. The chute 67 on the hopper, frusto-conical in shape, has an aperture 68 through which the mix is forced and into opening 71 in the upper half of the extruder casing 35. Viewing FIGURE 4, it is seen that the casing 35 of the extruder comprises upper and lower half-cylinders 76 and 77, respectively, separably connected along a horizontal plane of separation through the axis of extruder impeller 72.

Connection between the two halves of the extruder casing 35 is effected by the construction shown in detail in FIGURE 4a. Thus, the upper half 76 is provided at its planar surface with slotted lugs 48 and eyebolts 78 pivoted in brackets 50, integrally attached to the casing half 76 and positioned to depend through the slot of the respective lug 48. Likewise, the lower casing half 77 is provided at the horizontal edges of its planar surface with integrally attached slotted lugs 51, each of which receives a respective eyebolt.

The assembly of eyebolt pairs, as shown at FIGURE 4a, are duplicated at closely-spaced intervals along the length of the extruder casing so that when the nuts of all eyebolts are tightened the two halves are fixed together to define the high-pressure casing 35 in which the impeller 72 has a smooth fit.

The left end of the casing 35 is closed by a cap 79 which carries an antifriction bearing 70 journaling the impeller 72 at the left end only. A plate 49, secured about shaft 72a of the impeller to the outside of the cap 79, protects the bearing 70. In a manner similar to that described for securing together the casing halves 76 and 77, these halves are provided at their left ends, FIGURE 4, with slotted lugs 80. Although but one lug is shown and that on the casing half 76, it will be understood that both the halves 76 and 77 are provided with such lugs in closely-spaced circumferentially relation about their left peripheries. An equal number of eyebolts 83 are pivoted in brackets 84, each in position to extend through the slot in a respective one of the lugs 80. Likewise, the end cap 79 is provided with a number of slotted, radially-projecting lugs 85, circumferentially spaced and equal in number to the number of eyebolts, so that when the eyebolts are pivoted to extend each through an aligned pair of slots, and the nuts thereon are tightened, the cap 79 is secured to and makes a high-pressure, fluid-tight connection with the assembled extruder casing.

The shaft 72a of the impeller 72 is pointed at its right end, FIGURE 4, and is made hollow to receive steam which may enter at inlet connection 81 and leave at outlet connection 82. If desired, baffles, not shown, within the tubular shaft direct the steam from the inlet to the closed end of the shaft and then back to the outlet.

The shaft 72a is driven by a gear 74 fixed thereto. Referring to FIGURE 1, this gear is mounted within a floor-mounted housing 86 and is the final one of a speed-reducing train extending between a pinion, not shown, connected with the shaft of variable-speed driving motor 73.

Referring again to FIGURE 4, the assembled casing halves 76 and 77 form a reduced threaded projection 89 onto which an internally threaded jacketed head 75 is turned. Unit 36, FIGURES 1 and 4b, is an assembly comprising a motor 90 driving a vacuum pump or "de-airer" 92 by way of belt 91 with pipe 93 leading to the "de-airer" 92. The pipe 93 is shown in FIGURE 4 as being connected in pressure-tight relationship with chamber 94 in the head 75. Small orifices 95, leading from the chamber 94, are peripherally spaced about and through the head leading to the interior of the casing, allowing removal of air trapped in the mix, with tearing and cracking of the extruded forms due to entrapped air being avoided. It is noted from FIGURE 4 that die 88 on the extruder has a threaded connection with the head 75 and from FIGURE 4c that there are two apertures 87 therein each having rectangular cross section for the manufacture of modules of the same cross section. Of course, the die shown is removable and interchangeable with other dies properly shaped to produce modules of other cross sectional forms, such as tiles and slabs.

Operation of the extruder will be clear from the foregoing description. The mix flows downwardly through the hopper 66 and the opening 71, into the extruder casing 35, where it is picked up by the impeller 72. The mix is heated by the steam flowing within the impeller shaft, forced in a nearly-dry, highly compressed state from the die aperture or apertures 87, and deposited upon the contiguous underlying end of a conveyor generally identified at 37, FIGURE 1.

Figure 5:
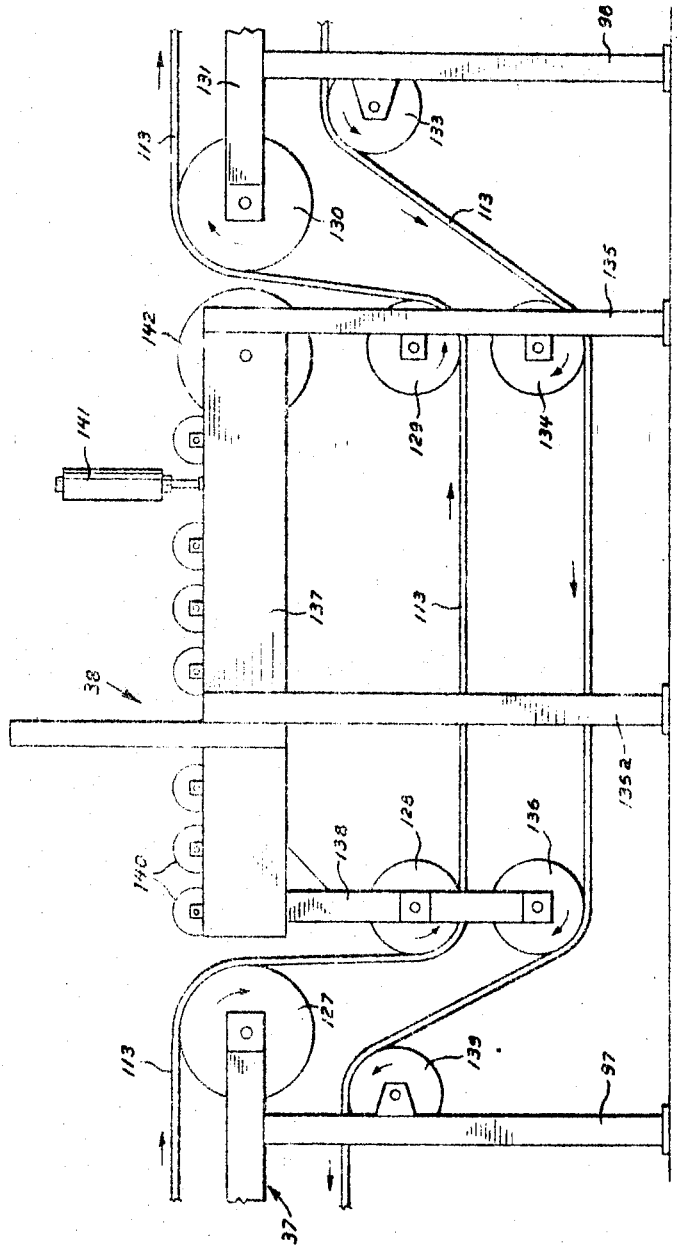
FIGURE 5 is a side elevational view, to a scale enlarged over FIGURE 1, of the cutter and the roller guide means for by-passing the conveyor belt thereunder.

Referring again to FIGURE 1 it is noted that the aforesaid conveyor 37 is supported upon standards 96, 97, 98 and 145. See also FIGURES 1a and 5. Conveyor belt 113 passes about an end pulley 126 adjacent the forward or output end of the extruder 35, thence horizontally to the right in an upper pass, to and downwardly about pulley 127, to and about a pulley 128 positioned below the cutter 38 and subsequently described in detail. From the pulley 128 the belt makes a horizontal pass to another pulley 129 journaled in the cutter frame, then moves upwardly around a pulley 130 journaled in frame 131. Referring to FIGURE 1a, the belt 113 passes from the pulley 130 to driving pulley 132 journaled at the right end of the frame 131, thence back beneath the frame to and downwardly over and about pulley 133 journaled in the standards 98 to pulley 134 journaled in standards 135 of the cutter frame and beneath the pulley 129 (see FIGURE 5). From the pulley 134 the belt 113 passes rearwardly in a straight horizontal pass to and upwardly about pulley 136 journaled in brackets 138 depending from cutter frame 137. Then the belt passes about pulley 139 back to the left end pulley 126.

Thus, the conveyor belt 113, while continuous, forms two longitudinally spaced upper horizontal passes moving in the same, or forward, direction. One of these passes receives the extruded mix forms coming from the extruder and the other and sequential pass receives the discrete modules which have been cut in the cutter mechanism 38. This continuous conveyor belt can, of course, be replaced by two separate continuous belts, one receiving extruded mix from the extruder 35 and feeding it to the cutter mechanism 38, and the other receiving modules from the cutter mechanism and feeding them to the infrared heater.

The cutter mechanism 38 is not shown in detail, but comprises generally the horizontally disposed open rectangular frame 137, supported by the standards 135 and further standards 135a. From FIGURE 5 it is noted that the cutter 38 is positioned between the aforesaid forward and rearward sections or passes of the conveyor belt 113.

A plurality of horizontal rollers 140 are journaled in and between the sides of the frame 137, for rotation on closely- and equally-spaced transverse horizontal axes, to support the continuously moving extruded mix. The cutter itself is power operated by means such as a pneumatic or hydraulic cylinder 141 carried by a frame, not shown, mounted on tracks for guided horizontal translation in the direction of travel of the extruded mix and carrying the aforesaid cylinder 141. The knife of the cutter is mounted within the frame 137, for vertical reciprocation or translation, by means of a connection with the piston and rod assembly of the cylinder 141. Since the extruded mix is continuously moving, the knife-carrying frame moves as a unit therewith during cutting. A cutting cycle comprises sensing means engageable with the advancing end of the extruded mix to measure the advance thereof over the rollers 140 by a distance equal to the predetermined length dimension of the modules being produced and means responsive to the measured advance to energize a circuit controlling a solenoid valve, not shown, admitting fluid under pressure to the cylinder 141 and thereby forcing the knife vertically downwardly through the extruded mix to sever the forward end, or ends, thereof. During this cutting operation the frame, knife, cylinder and parts assembled therewith move as a unit with the extruded column of mix. The cutting knife is automatically retracted vertically and, after retraction, translated, also automatically, in the opposite direction of horizontal movement of the mix to the initial or starting point. The action is smooth and rapid so that, once production has started, there is no time delay due to cutting.

From the cutter 38 the individual uncured modules pass over a power-driven end roller 142 to the final pass of the belt 113, as previously described. Referring to FIGURE 1a, belt 113 is driven by a motor and speed reducer unit 143, mounted upon the standard 145. A chain drive 144 connects the motor and speed reducer with the conveyor pulley 132.

Referring to FIGURE 1a, the cut, uncured modules pass from the forward end of the conveyor belt 113 to the conveyor 166, which serves both the infra-red heater 146, as well as the dielectric heater 143 as subsequently described. The infra-red pre-heater 146, FIGURES 7 and 7a, comprises an elongated hollow cylindrical casing 41 supported on end frames 148, 149, shown in FIGURE 7. The casing is a double-walled sectional built-up assembly.

Figure 7:
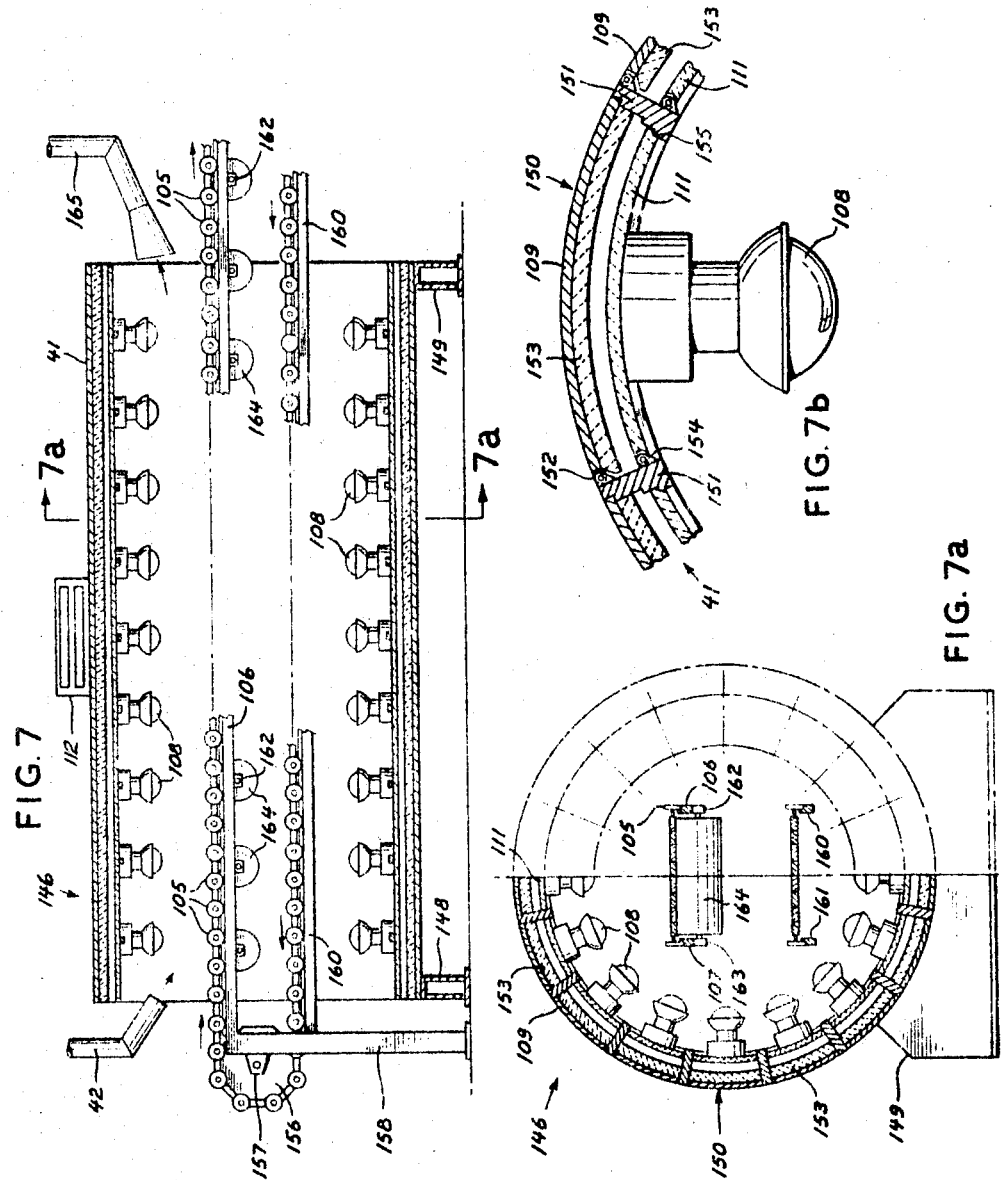
FIGURE 7 shows a vertical longitudinal sectional view of the infra-red heater tunnel and portions of the conveyor axially traversing the same.

Referring to FIGURES 7, 7a and 7b, the casing 41 comprises a number of identical elements or sections 150 of the same length as the axial dimension of the casing. One of these sections is shown in FIGURE 7b to consist of a stringer 151, stepped in cross-section, and to which are hinged at connection 152 an outer plate or wall 109, and at connection 154, an inner plate 111. The plates are radially spaced to provide a dead air space between them. The hinge axes of the two plates are normal to the plane of FIGURE 7b. The free edge of the plate 109 rests upon the first or radially outward tread of the stepped surface of the stringer 151 of the next succeeding section. The inner surface of the plate or door 109 has secured to it a sheet 153 of heat insulating material, such as asbestos or fibreglass. The free edge of the inner plate 111 has a stepped portion 155 to fit over the radially inward step of the stringer 151 of the next adjacent section. Each section thus described is complete in itself and the plates thereof are interfitting portions of the surface of a cylinder such that, when sixteen of them are assembled, they conjointly define a cylindrical casing. Each of the aforesaid inner plates 111 has a series of nine longitudinally-spaced infra-red heater elements 108 secured to its inner surface. Since the plate 109, with its heat insulating pad 153, may be swung outwardly about its hinge axis and the door or plate 111 may also be similarly opened about its hinge axis, repair, inspection and replacement of the heater units 108 are facilitated. Suitable latch means, not shown, secures the free edge of each plate to the stepped surface of the stringer 151 of the next adjacent section. Although for clarity of illustration in FIGURE 7b clearance has been shown between the plates of one section and the stepped surfaces of the next adjacent stringer, it will be understood that in the completed and assembled casing the parts are in snugly interfitting relation to form a rigid, unitary, heat-insulated, cylindrical casing as seen in the longitudinal and transverse vertical sections of FIGURES 7 and 7a, respectively. Since each of the aforesaid inner section plates 111 has a row of nine of the infra-red heaters 108, and there are sixteen sections, there is a total of 144 heater units disposed uniformly over the interior surface of the assembled casing. In FIGURE 7 a junction or outlet box 112 is seen to be mounted centrally on top of the casing 41, to which the main leads are connected and from which current is drawn by leads, not shown, by each of the heater units 108.

Figure 6:
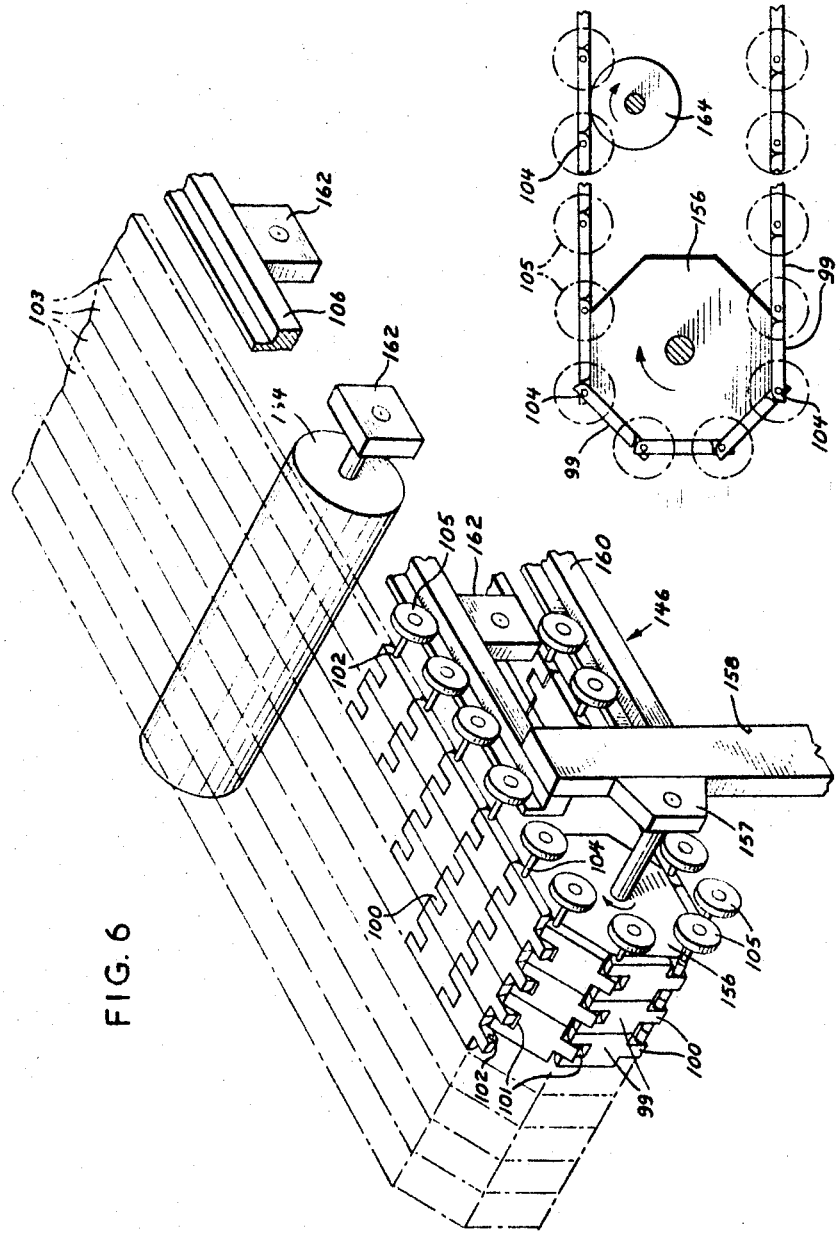
FIGURE 6 shows a perspective view, partially broken away, of the rearward portion of the link belt by which modules being produced are conveyed through the infra-red heater and the dielectric heater, in succession.

A special conveyor, subsequently described, includes the belt 166 having vertically-spaced upper and lower horizontal passes traversing the infra-red and induction heaters in the axial or longitudinal direction. Referring to FIGURES 6, 6a and 7, the conveyor is supported at its left or rearward end, just outside the infra-red heater housing 41, by an octagonal roller 156, journaled in bearings 157, one only of which is shown, carried by standard 158. Standard 159 at the right end of the conveyor is shown in FIGURES 1a and 8.

A pair of laterally-spaced horizontal upper tracks 106 and 107, FIGURES 6, 7 and 7a, extend longitudinally and centrally through the infra-red heater casing 41. Referring to FIGURE 6 in particular, the tracks 106 and 107 are L-shaped in cross section to support and guide conveyor wheels 105 for travel therealong. The conveyor belt itself is formed by a large number of identical links 99, each of which consists of a flat rectangular body having a projection 100 extending centrally from one end in coplanar relation therewith, and having a notch or recess 101 in its other end edge, within which the projection of the next succeeding link has a smooth fit. The links 99 and the octagonal end rollers 156 are dimensioned so that, as depicted in FIGURE 6a, the interpivoted links pass smoothly about each roller.

The entire belt consists of a large number of the aforesaid links 99 pivotally connected together in end-to-end and side-by-side relation. This interconnection is effected by a series of rods 104, each of which has a length somewhat greater than the over-all width of the conveyor belt and which passes through aligned holes 102 in the interfitting links. Each of the rods 104 projects at each of its ends from the conveyor belt and has a pair of the wheels 105 journaled on its respective ends. The dimensions are such that the wheels 105 at one side pass forwardly on and guided by the track 106 while those at the other side are similarly supported upon and guided by the track 107 (see FIGURE 7a). In their return pass the wheels roll on and are guided by a second pair of tracks 160 and 161, FIGURE 7a, each vertically below and parallel with the respective tracks 106 and 107. From FIGURE 6 it is seen that the track 160, for example, is supported at its rearward end by the standard 158. In the arrangement shown the belt comprises eight rows 103 of links in side-by-side relation. Each row is of a length determined by the dimensions and separation of the infra-red and dielectric heaters as subsequently described. The conveyor belt thus forms a flat upper pass without openings, so that the modules, such as bricks or tiles, are fully supported thereon and are left unmarked in their travel with the belt. Also, as subsequently described, the upper pass of the belt forms a part of one electrode of the dielectric heater 43.

From FIGURE 6 it is noted that right upper track 106 has a plurality of bearing blocks 162 secured thereto and equally placed along its length. Similarly, the track 107 has a like number of blocks 163, FIGURE 7a, each of which forms a pair with a corresponding one of the opposite blocks 162. Each pair of blocks journals a support roller 164. The rollers 164 are placed below and in supporting contact with the upper pass of the link belt to eliminate sag and assure an essentially flat planar support for the modules carried thereon. The rollers 164 may be individually power driven by means, not shown, at the same peripheral speed as the linear speed of the belt, or, preferably, they may be rotated merely by frictional contact with the belt in passing thereover (see FIGURE 7). In order to conserve heat to the greatest possible extent, baffles, not shown, of heat-insulating material may be secured over and across each end of the infra-red heater casing 41, with openings just sufficient to permit the unobstructed passage thereinto of the belt and the items supported upon its upper pass. FIGURES 1a and 7 show an inlet 42 from a blower 39 by which dry hot air is directed into the infra-red heater casing 41 from the left end thereof and which is exhausted from the casing by pipe 165 extending to the intake of a second blower 40. The air circuit may be a closed one wherein the blowers draw in air from the pipe 165 and deliver it under a low pressure to the pipe 42, with only enough make-up air to keep the air entering the casing at predetermined low humidity.

Figure 8C:
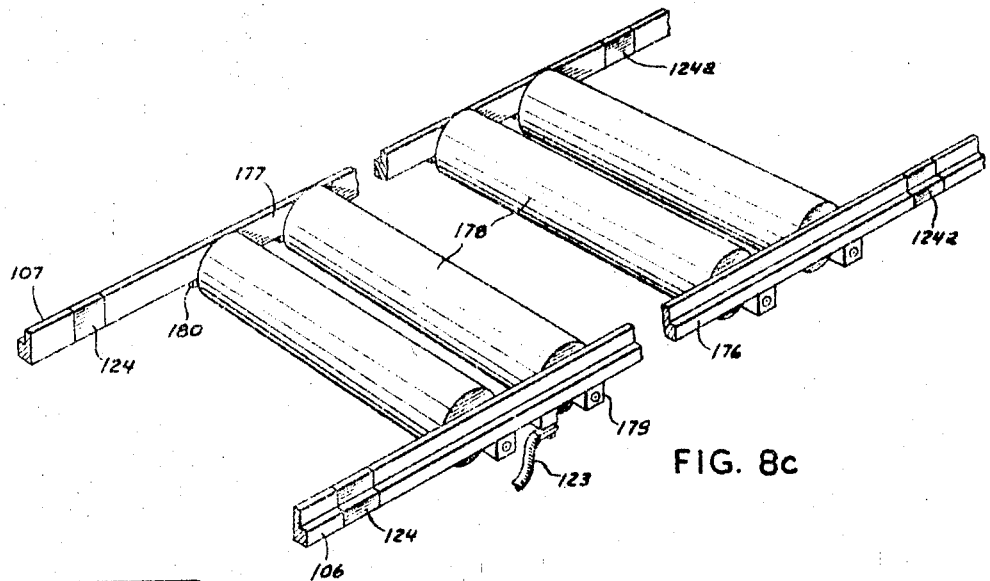
FIGURE 8c is a perspective view of the insulated tracks within the dielectric heater and the roller system for supporting the link conveyor belt while traversing the same.

Referring to FIGURES 1a and 8, the link conveyor belt 166, previously described, extends in a straight horizontal upper pass through both the casing 41 of the infra-red heater and the housing 43 of the dielectric heater. At its forward end where it emerges from housing 43 the belt passes about roller 167, journaled in bearings supported by standards 159 with a pulley 122 attached thereto driven by motor 125. The belt then passes downwardly to and about roller 168, also journaled in standards 159, and from thence rearwardly, with its wheels 105 supported on and rolling along a pair of horizontal tracks 170, to and upwardly about a roller 171 journaled for rotation in bearings on standards 172. From the roller 171 the belt passes to and over roller 173 and then rearwardly in a horizontal lower pass to and within the infra-red heater housing 41 to the rearward end roller 156, previously described. Top or upper tracks 176 and 177 of the dielectric heater are essentially aligned continuations of the respective tracks 106, 107 of the infra-red heater (see FIGURE 8c) and are of like cross sectional form to support the belt wheels 105 for rotation and travel therealong. However, the tracks 176 and 177 are electrically insulated from the tracks 106 and 107 by dielectric sections 124. Like sections 124a insulate these tracks from the continuations thereof at the forward end of the heater. As in the case of the infra-red heater, rollers 178 are journaled in bearing pairs 179 and 180 (see FIGURE 8c), attached to and uniformly spaced along the under side of the respective tracks, so that the rollers 178 support the upper pass of the link belt in horizontally flat coplanar position. It can be seen by FIGURES 8 and 8c that current lead-in connections 123 are attached to one or both of the tracks, that for the track 176 only being shown. It will be understood that all rollers for the belt 166 are of the octagonal form shown.

The housing 43 of the dielectric heater, FIGURE 1a, comprises walls forming a closed chamber, except for openings 181, 182, FIGURE 8, at its rearward and forward ends, to admit the upper pass of the link belt and the production articles thereon. The dielectric heater housing 43 is provided with a radio frequency shield, preferably a copper screen shield (not shown), either surrounding it or imbedded therein to protect the outside electrically from interferences.

From FIGURE 8 it is seen that floor portion 174 of the housing is positioned above the lower pass of the conveyor belt.

The upper electrode of the heater is a flat metallic plate 116 which, as is seen from FIGURES 8, 8a and 8b, has a length a little less than that of the housing and a width somewhat greater than that of the link belt passing through the housing. The plate 116 has a pair of centrally-disposed, longitudinally-spaced racks 118, 118a extending vertically from its upper face, each passing through a respective one of a pair of openings in roof or cover 115 of the housing. A shaft 110 is journaled in bearings 117, secured to the roof 115 of the housing, for rotation on a horizontally-disposed longitudinal axis. The shaft 110 has worms 114, 147 fixed in spaced relation thereon. Each worm meshes with a respective one of two gears 183, only one of which is shown. The gear 183 is fixed to a shaft 184 journaled in bearings 185, 186 fixed to the top of the housing so that the shaft may rotate about a horizontal transverse axis. A pinion 119, fixed with the shaft, meshes with the rack 118. There is a similar connection through pinion 119a between the worm 147 and the rack 118a, as will be clear from FIGURE 8, so that when the shaft 110 is rotated by handwheel 120 fixed to its right end the spacing of the electrode 116 above the upper pass of the link belt conveyor is varied. A lead 121 conducts the high-frequency current to the electrode 116 which, of course, is fully electrically insulated from casing 43.

The lower, or grounded, capacitor-electrode is formed by the metal of the portion of the link belt underlying the electrode 116, so that a very fine adjustment, or spacing, between the two electrodes may be effected.

A conventional circuitry is selected to create the desired field limited only to the dielectric material of the modules being hardened. Thus molecular bounce and internal friction occur only in the module material itself and any significant amount of heat the conveyor could absorb from the modules it transports is dissipated by its own speed of travel and because of the short duration of its path through the dielectric heater. While the raw modules produced by the preceding apparatus portions of this invention usually do have an optimum uniform mixture, their texture is not always ideally uniform due to the fact that the clay used in the modules is heterogenous. Great variations occur in the composition of even a single batch thereof. As a result there is a continuously variable stratification of the raw brick passing between the electrodes. In order to secure a uniform output, particularly when such is required because of the coloring matter added, it is desirable to expose all strata of the raw brick to the dielectric effect. This requirement is complicated by the fact that the dielectric field is created substantially at right angles to the electrodes.

The apparatus of FIGURE 8 shows a structure producing a vertical dielectric field within rows of raw modules passing between the horizontal planes of the two single electrodes. It is within the scope of this invention to produce independently thereof, and/or in addition thereto, an additional horizontal dielectric field at angles to the vertical dielectric field by using the same circuitry as will be described with reference to the vertical field.

Figure 9:
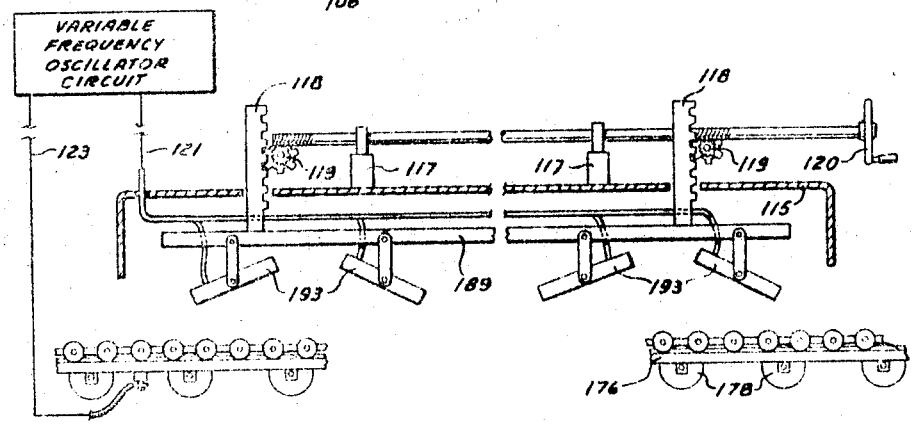
FIGURE 9 is a diagrammatic side elevational view showing a further form of upper electrode arrangement in the dielectric heater.
Figure 10:
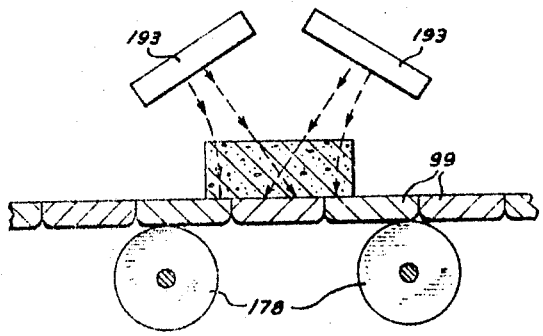
FIGURE 10 is a diagrammatic representation showing still another form of dielectric heating by tilting of the upper electrodes in the dielectric heater.

The modification shown in FIGURES 9 and 10 is an optional form of electrode arrangement in a dielectric heater for an improved dielectric heat control to overcome non-uniform stratification in the clay product.

When the rollers 178, the track and the links of the conveyor belt 166 together form the bottom capacitor electrode continuous movement of the rollers and of the links tend to dissipate the direction of the dielectric field since the alignment with the upper capacitor electrode does not remain vertically constant. The present invention utilizes this apparent disadvantage to more uniformly cover the dielectric space and to penetrate the clay from various angles to compensate for any stratification thereof, by the optional structure shown in FIGURES 9 and 10.

Upper electrode-bars 193 are mounted to pivot independently or as a unit about points intermediate their transverse dimension, when looking at FIGURES 9 and 10. The upper capacitor-electrodes 193 are shown in FIGURE 9 pivotably suspended and connected by links to a shifter bar 189 and the electrical conduit 121. The electrodes may be moved by simple mechanical means to pivot at a limited angle, or to rotate in or against the direction of the arrows. The motion may be synchronous for all electrodes or independently controllable for each or for pairs or gangs of them. The shifter bar 189 may be used for the electrical circuit connection of the electrodes to be connected with the terminal lead 121 of the high frequency oscillator circuit. Optionally, each electrode may be provided with its own independent oscillator circuit to improve on the efficiency of the system.

Spacing control of the distance of the upper electrode from the conveyor by way of the rack 118, shown and described in conjunction with FIGURE 8, may be retained.

Thus, continuously changing angles of dielectric fields are created. The variable directions and strengths of the dielectric fields thus created, coupled with the simultaneous continuous movements of the clay passing on the conveyor, assure an improved uniform treatment through the various layers, strata and compositions of the clay.

As an optional additional embodiment a separate set of electrodes, in the form of a pair of elongated horizontal electrodes, may be placed longitudinally, in parallel with the line of modules passing along the conveyor, to create a horizontal dielectric field. The electrodes may be fixed or pivotable and their spacing relative to the modules may be controlled. They may have their own independent high frequency source of power. They may be positioned within the same segment of the dielectric heater to cross perpendicularly the vertical dielectric fields created by the top and bottom electrodes or they may be positioned in from of or behind the vertical field sector.

The necessary power and frequency involved in the circuit for the production of the dielectric field are calculated by estimating the specific heat of the average raw module, its average weight, the temperature change in correlation with the time of heat exposure, the spacing of the electrodes and the speed of the conveyor as it transports the raw modules within the dielectric field. The principles of these calculations are known. In practical applications there are often variations from batch to batch and often even from row to row of raw modules which would affect the properties and coloring of the clay end-product. An additional optional embodiment of the present apparatus carries mechanisms continuously sensing and averaging the specific weight of each passing row of raw modules, the cubic content thereof being constant, and the temperature changes and the heat of each batch. While each such sensing mechanism, per se, is conventional and therefore not shown in detail, their combinations in this apparatus with conventional computers and means to control the electrode spacing, the current frequency, kilowatt input and speed of the conveyor are considered a part of this specification.

Figure 11:
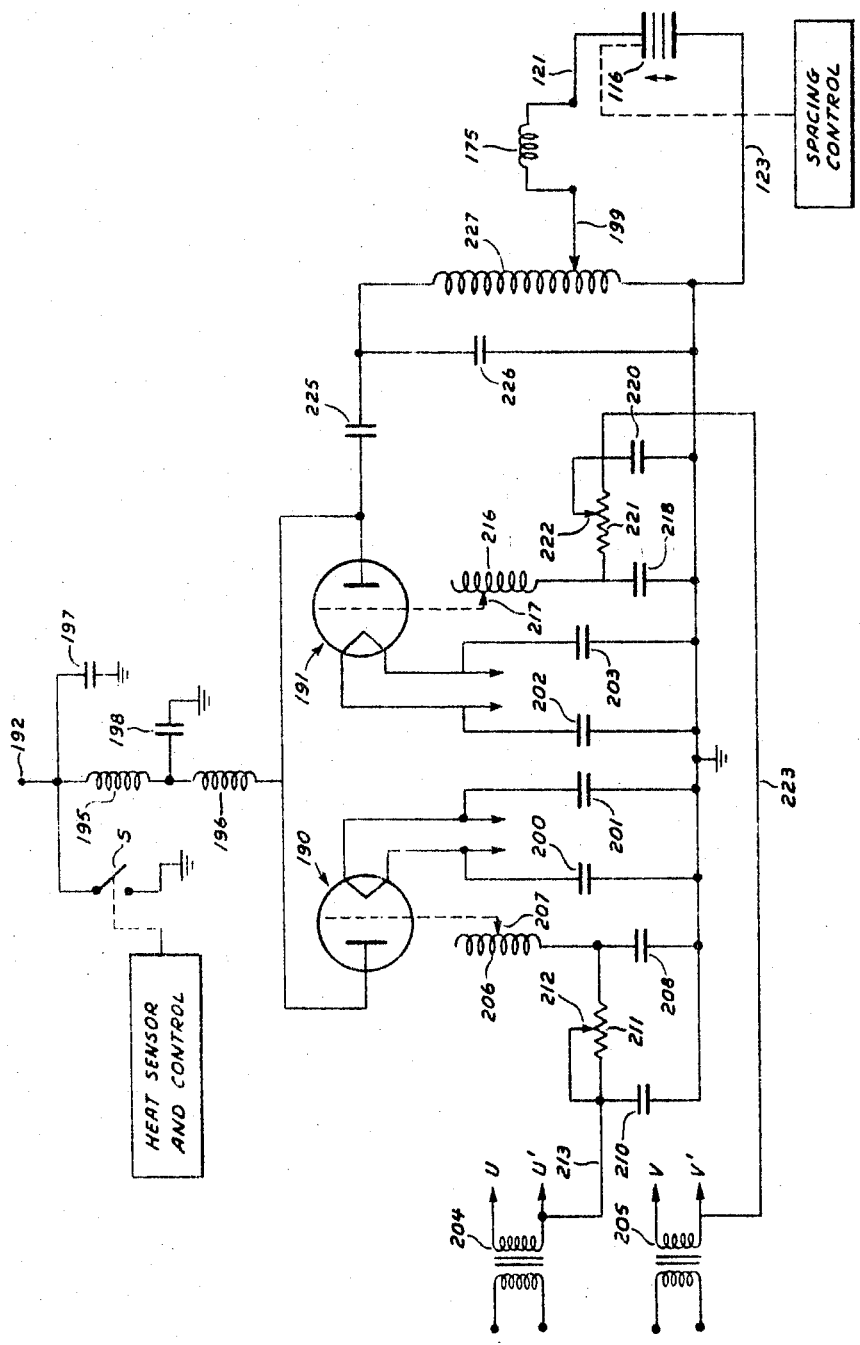
FIGURE 11 is a schematic diagram of an oscillator circuit for controllably generating high frequency energy to heat the dielectric.

In order to keep the heat constant a continuous tuning is provided for by variably spacing the upper electrode to and from the dielectric by spacing control means shown and/or by changing the inductance by means of the adjustable inductor 175 shown in FIGURE 11, which illustrates a schematic diagram of an oscillator circuit for controllably generating high frequency energy to heat the dielectric. A heat sensor and control is also shown schematically connected to a switch to provide a short circuit to ground. The circuitry in FIGURE 11 is shown for the purpose of illustrating the operability of the invention in connection with the controls stated above. Various other conventional circuits known to those skilled in the art may be substituted therefore and the controls could be operably included with such without exercise of additional ingenuity.

In FIGURE 1a a blower 187 is shown connected with pipe 188 delivering dry hot air under low head into the dielectric heater housing 43. A second blower 44 exhausts air from the other or forward end of the housing. As in the case of the infra-red heater, the air circuit may be a closed one with humidity controls to make certain that all modules coming from the dielectric housing are properly baked. The housing 43 is heat insulated to conserve heat radiated from the bricks traversing it.

After leaving the dielectric heater the modules are transferred to the cooling conveyor 46, FIGURE 1a, to be cooled by a blast of air directed upon them from a blower 45. In all cases transfer of the bricks from the leading terminal of one conveyor to the trailing terminal of the next is effected or aided by the momentum of the moving bricks themselves.

Referring to FIGURE 11 of the drawings, the oscillator circuit for generating high frequency energy to heat the dielectric load comprises a pair of vacuum tubes 190 and 191, which are connected in parallel with an anode voltage supply terminal 192. The positive side of a suitable source of rectified alternating voltage, not shown, is connected to the terminal 192. The other side of the source of rectified voltage is connected to ground.

A pair of high frequency choke coils 195 and 196 are connected in series between the terminal 192 and the anodes of the tubes 190 and 191. Bypass capacitors 197 and 198 connect the upper ends of the coils 195 and 196, respectively, to ground.

The cathodes of tube 190 and 191 are connected by leads U', U and by leads V', V, respectively, to secondary transformer windings 204 and 205, respectively, of low frequency alternating current sources of heater voltage, not shown. Bypass capacitors 200, 201, 202 and 203 connect the leads U', U, V' and V, respectively, to ground.

The grid and the cathode of the tube 190 are interconnected by an inductor 206, having an adjustable tap 207, a grid biasing resistor 211, having an adjustable tap 212, and a connection 213. Capacitors 208 and 210 connect the opposite ends of the resistor 211 to ground. Similarly, the grid and cathode of the tube 191 are interconnected by an inductor 216, having an adjustable tap 217, a grid biasing resistor 221, having an adjustable tap 222, and a connection 223. Capacitors 218 and 220 connect the opposite ends of the resistor 221 to ground.

The anodes of the tubes 190 and 191 are connected by a direct current blocking capacitor 225 to one end of a parallel tuned circuit formed by a capacitor 226 and an inductor 227. The other end of the tuned circuit is connected to ground.

An adjustable tap 199 is provided along the inductor 227 for tapping off high frequency energy at a suitable point of low potential and low impedance. The tap 199 is connected to the upper electrode 116 of the dielectric load by the adjustable inductor 175 and the lead 121. The other electrode of the dielectric load is connected to ground by the lead 123.

In operation the oscillator generates energy at high frequency which is determined by the resonant frequency of the parallel tuned circuit formed by the capacitor 226 and the inductor 227. The inductor 175 is varied to series tune the dielectric load circuit to the frequency of the oscillator. Series tuning of the load circuit causes maximum current to pass through the dielectric load and maximum heating of the load. If for any reason the load circuit changes its impedance the inductor 175 should be varied accordingly to series tune the load circuit again manually or otherwise.

When the modules are heated the dielectric constant of the element might change, which in turn changes the capacity of the capacitors. In such an instance the inductor 175 has to be adjusted to series tuned circuit to supply maximum heating current to the dielectric load.

In order to improve on the variations of the total capacitance, direction of orientation of the capacitor electrodes may be varied, as shown in FIGURE 10, by tilting the electrodes. Also, by the method shown in FIGURE 10, independently and/or simultaneously, the lines of heating forces may be directed to obtain universal uniform heating effect in three dimensions.

As already explained the single endless belt-conveyor transports the semi-raw modules in an uninterrupted single pass through and from the infra-red heater to and through the dielectric heater without loss of time and heat to the modules. Thus, the modules undergo the preheating and heating processes at a constant linear speed and without interruption, because the moment they enter the pass within the dielectric heater they become subjected to the dielectric field. This step considerably aids the uniformity of the module output. It can be appreciated, however, that the continuous conveyor belt passing through both the infra-red and the dielectric heater can be replaced, if desired, by two conveyor belts feeding the infra-red and dielectric heater separately. In such case, the conveyor belt carrying modules through the infra-red heater would discharge the fully dried and pre-heated modules onto the conveyor belt carrying the modules through the dielectric heater.

It is to be noted that by the utilization of the novel extruding technique of the invention, by which the clay mix is extruded in a compressed and heated state, the raw modules are substantially dry and warm after leaving the extruder and cutting mechanism. Thus, it is possible to feed the raw modules directly to the dielectric heater while eliminating the need for the infra-red heater. This procedure, of course, puts a heavier load on the heating requirements of the dielectric heater. It has been found most advantageous to include the infra-red heater in the circuit in order to completely dry and impart considerable pre-heat to the raw modules before subjecting them to the dielectric heating.

Summarizing the operation of the apparatus, carefully proportioned amounts of clay, water and mineral pigments are deposited into the mixer tank 32 and the motor 60 is energized to mix the materials within the upper compartment 30. After a predetermined period of mixing, the cylinders 54 and 54a are operated to swing the members 214 and 215 downwardly to enable the mix to pass to the lower compartment 53 of the tank, where further blending takes place. The mix then drops into the housing 57 and is impelled therefrom at a steady uniform rate by the impeller 58. As soon as the first batch has gravitated from the upper compartment 30, the members 214 and 215 are closed and a new charge of materials is introduced therein and mixed, ready to be dropped into the lower compartment as soon as the previous charge has been expelled therefrom.

A mixer of the type shown can be made to accommodate a batch of 2½ tons of mix. The rotational speed of the shaft 59 of such a mixer is about 120 r.p.m., with a mixing period of 30 minutes. Because of the utilization of upper and lower chambers in the mixer tank, the operation is continuous with a new batch being mixed while the preceding batch is being delivered to the extruder.

The first batch is deposited in a steady, uniform stream onto the elevating conveyor 33, by which it is dropped into the hopper 66. From this hopper the material is fed to the extruder, also in a steady uniform stream, due to the action of the feed screw 69. The action of the screw also assists in assuring that the mix, as passed to the extruder, is completely and thoroughly blended.

In the extruder the mix is heated by the steam in the hollow shaft of the impeller 72 and as it moves axially toward the die 88 it becomes highly compressed. As the mix leaves the extruder it is hot and almost dry and has the consistency of substantially moisture-free, dry pressed clay. Lubrication added by conventional means to the extruder head reduces the friction and heat otherwise generated at the die, and assures that the extruded column, or columns, have smooth surfaces free from tears and cracks.

The feature by which the extruder casing is formed in upper and lower halves is important because it enables the casing to be opened for cleaning, repairs and replacements. It is noted also that the jacket 75 assists in maintaining the halves in assembled relation at the die ends thereof. The extruder is powered by a 550 H.P. motor and, aided by the double apertures 87 in the die, has a large capacity per unit time.

From the extruder the shaped columns of mix are disposed upon the rearward section of the belt 113 and conveyed thereby to the cutter which, as previously described, effects cutting or severing of the columns into standard lengths, while moving synchronously with the material.

From the cutter the cut modules are pushed onto the forward section of the belt 113 and conveyed thereby to the link belt conveyor 166 at the entrance to the infra-red heater.

In the infra-red heater the temperature of the modules, on passing therethrough, is raised to about 350° F. Since the heaters are uniformly distributed over the inner cylindrical surface of the heater housing, heating of the modules is uniform and they leave this heater substantially dry and at an elevated temperature, which reduces the time required for their baking in the dielectric heater.

From the infra-red heater the hot modules pass directly to the dielectric heater upon the belt 166 where, in the case of bricks or tiles, they are rapidly brought to a uniform high temperature of about 1800° F. Since the moisture content of the extruded mix as it leaves the extruder is low, and is still further reduced by the preliminary heating in the infra-red heater, final baking of the modules in the dielectric heater is carried out in a practical and rapid manner. The spacing of the electrode 116 above the articles passing therebeneath on the belt 166 is determined by the density of the clay in the mix, other factors being constant. The length of the dielectric heater for the production previously described is about twelve feet and its electrical capacity of the order of 30 kw. The upper electrode 116 has a length about equal to the corresponding dimension of the housing and a width of about 24" when a single column of mix is being extruded, and 48" when two columns of mix are being simultaneously produced.

The present invention thus provides a method and apparatus which fulfills all the objects previously stated. The method and apparatus are capable of the production of baked clay bricks, for example, at the rate of 4000 per hour from the combination of apparatus as described in conjunction with FIGURES 1 and 1a, and which are superior to bricks produced by present-day methods in that they have a low percentage of moisture absorption and high compressive strength. Unlike kiln-burning methods, my method enables the use of mineral pigments to obtain a very precise control over coloring, so that any given color or shade can be duplicated as desired in subsequent batches.

The arrangement of the essential parts providing for the combination of the vertical mixer with the vertical, or almost vertical, conveyor means from the mixer to the extruder, the combination of the conveyor 37 with the cutter and a common conveyor for the infra-red and dielectric heaters permits the optimum utilization of floor space and volume, which in turn also permits an efficient radio shielding, the whole combination permitting the construction of a very compact apparatus which can be permanently built or asesmbled to be easily moved.

Comparing the operation of the conventional brick manufacturing plant with the unit here proposed, in the prior art it has been necessary for the production of 40,000 bricks in 8 hours to employ 50 to 60 men and to use 3 kilns, the output being non-uniform as to quality, porosity, brittleness, and, if colors were added, as to coloring. On the other hand, a plant of the present invention producing the same number of bricks requires a floor space which is up to 50% smaller than that of the conventional plants and the services of only 16 men working 8 hours to obtain a substantially uniform product which has dimensional stability, improved compressive strength and faithfulness of color reproduction, while having production costs of in the order of one third or less than the conventional brick manufacturing plants.

What I claim as my invention is:

1. An apparatus for producing hardened clay products which comprises a closed extruder means, means for delivering a clay mix to the extruder, said extruder means being provided with means for heating the mix, an extruder orifice and means for extruding the heated mix under pressure through said orifice, cutter means adjacent said extruder for receiving the mix from said extruder and for cutting said extruded clay mix into shaped modules, an infra-red heater for drying and preheating said shaped modules, means for delivering shaped modules from said cutter to said infra-red heater, means for passing modules through the infra-red heater, a dielectric heater, means for delivering shaped modules from the infra-red heater to said dielectric heater, an endless electro-conductive conveyor belt forming a pass to and through said dielectric heater, said belt forming a lower electrode within the dielectric heater and a conveying means for modules, an upper electrode comprising a flat metallic plate mounted in said dielectric heater in spaced relation with said belt to allow passage therethrough of modules as a dielectric on said belt and between the belt and the upper electrode, means for variably spacing said upper electrode from said lower electrode, a variable frequency oscillator circuit connected to and forming a high frequency dielectric heating circuit with said upper and lower electrodes, means for continuously sensing changing conditions in the dielectric passing through said dielectric heater, means for continuously changing the inductance of the dielectric circuit in response to changes in the dielectric passing through the dielectric heater, radio frequency shielding means enclosing said dielectric heater and means for withdrawing baked clay products from the dielectric heater.

2. An apparatus for producing hardened clay products which comprises a closed extruder means, means for delivering a clay mix to the extruder, said extruder means being provided with means for heating the mix, an extruder orifice and means for extruding the heated mix under pressure through said orifice, cutter means for receiving the mix from said extruder and for cutting said extruded clay mix into shaped modules, a dielectric heater, means for delivering said shaped modules to said dielectric heater, an endless electroconductive conveyor belt forming a pass to and through said heater, said belt forming a lower electrode within the dielectric heater and a conveying means for modules, an upper electrode mounted in said heater in spaced relation with said belt, a variable frequency oscillator circuit connected with said upper and lower electrodes, means for sensing changing conditions in the dielectric of clay modules passing through said heater, control means for changing the inductance of the dielectric circuit and means for withdrawing baked clay products from the dielectric heater.

3. An apparatus for producing hardened clay products as claimed in claim 2 which includes a dual compartment mixing apparatus with an upper premixing compartment, a lower final mixing compartment, separation means between said upper and lower compartments, controllably operated means for transferring material by gravity from the upper compartment to the lower compartment and means for transferring mixed material from said lower compartment to the closed extruder means.

4. An apparatus for producing hardened clay products as claimed in claim 2 which includes an infra-red heater for drying and preheating shaped modules, means for delivering shaped modules from the cutter to said infra-red heater, means for passing modules through the infra-red heater and means for delivering shaped modules from said infra-red heater to the dielectric heater.

5. An apparatus for producing hardened clay products as claimed in claim 4 wherein the endless electro-conductive conveyor belt forms a continuous pass through both the infra-red and the dielectric heaters to form a conveying means for clay modules to and through the infra-red heater and from the infra-red heater to and through the dielectric heater.

6. An apparatus for producing hardened clay products as claimed in claim 2 which includes a means for variably spacing the upper electrode from the lower electrode.

7. An apparatus for producing hardened clay products as claimed in claim 2 which includes means for changing the inductance of the dielectric circuit in response to changes in the dielectric of clay modules passing through the dielectric heater.

8. An apparatus for producing hardened clay products as claimed in claim 2 wherein the upper electrode comprises a plurality of electrode units adapted to be pivotally moved about their transverse axes to provide separate lines of dielectric heating current at different angles to the lower electrode.

9. An apparatus for producing hardened clay products which comprises a dual compartment mixing apparatus with an upper premixing compartment and a lower final mixing compartment, separation means between said upper and lower compartments, controllably operated means for transferring material by gravity from the upper compartment to the lower compartment, a closed extruder means, means for transferring clay mix from said lower compartment to said closed extruder means, said extruder means being provided with means for heating the mix, an extruder orifice and means for extruding the heated mix under pressure through said orifice, cuter means adjacent said extruder for receiving the extruded clay mix therefrom and cutting the same into shaped modules, an infra-red heater for drying and preheating said shaped modules, means for delivering modules from said cutter to said infra-red heater, a dielectric heater for baking clay modules received from the infra-red heater, an endless electro-conductive conveyor belt mounted to form a continuous pass to and through the infra-red heater and the dielectric heater respectively, and adapted to transport clay modules through said infra-red heater and to and through said dielectric heater, said belt forming a lower electrode within the dielectric heater, an upper electrode mounted in said dielectric heater in spaced relation with said belt to allow passage therethrough of clay modules as a dielectric on said belt and between the belt and the upper electrode, means to variably space said upper electrode from said dielectric, a variable frequency oscillator circuit connected to and forming a high frequency dielectric heating circuit with said upper and lower electrodes, means for continuously sensing changing conditions in the dielectric passing through said dielectric heater, means for continuously changing the inductance of the dielectric circuit in response to changes in the dielectric passing through the dielectric heater, radio-frequency shielding means enclosing said dielectric heater and means for withdrawing baked clay products from the dielectric heater.

10. An apparatus for producing hardened clay products as claimed in claim 9 wherein the closed extruder means contains a pressure screw feeder, heating means within the screw feeder and at least one extruder orifice with a cross section the same as the clay modules to be produced.

11. An apparatus for producing hardened clay products as claimed in claim 9 wherein the upper electrode comprises a flat metallic plate.

12. An apparatus for producing hardened clay products as claimed in claim 9 wherein the upper electrode comprises a plurality of electrode units adapted to be pivotally moved about their transverse axes to provide separate lines of dielectric heating current at different angles to the lower electrode.

13. A process for producing hardened clay products which comprises feeding the clay product ingredients to a two compartment mixing apparatus, mixing the ingredients in the first compartment thereof, feeding the first compartment mix to the second compartment of the mixer and further mixing the ingredients to form an intimate mixture therein, continuously feeding said intimate mixture to a closed extruder means adapted to heat and compress said intimate mixture, heating and compressing the intimate mixture in said extruder, continuously extruding the intimate mixture through an orifice of desired cross section on said extruder in a continuous ribbon and in a compressed, heated state to allow substantial drying thereof, continuously feeding said extruded ribbon of desired cross section to a continuous cutting device, cutting said ribbon into raw, shaped, clay modules, continuously feeding said raw, substantially dry modules to an infra-red heater, continuously passing said modules through the infra-red heater to completely dry and preheat the same, continuously feeding said dry and preheated modules from said infra-red heater on a continuous electro-conductive conveyor belt to a dielectric heater, said conveyor belt being adapted to pass through and forming a lower electrode within the dielectric heater and said dielectric heater having an upper electrode therein mounted in spaced relationship from said modules and connected with said lower electrode to a variable frequency oscillator circuit to form a high frequency dielectric heating circuit therewith, continuously passing said modules as a dielectric on said belt under said upper electrode, directing a high frequency dielectric heating current through the modules, continuously sensing changes in the make-up and conditions of the dielectric modules passing through the dielectric heater, continuously changing the inductance of the dielectric heating circuit in response to said changes in the dielectric modules passing through the dielectric heater and removing the modules from the dielectric heater as a substantially uniform, hardened clay product.

14. A process for producing hardened clay products as claimed in claim 13 wherein the first compartment of the mixer is located above the second compartment, the ingredients are mixed in batches in the first compartment and are dropped by gravity into the second mixing compartment.

15. A process for producing hardened clay products as claimed in claim 13 wherein the modules are extruded from the closed extruder under sufficient pressure and a sufficient degree of heat to dehydrate the same.

16. A process for producing hardened clay products as claimed in claim 13 wherein the raw clay modules are continuously fed on one continuous electro-conductive conveyor belt to and through the infra-red heater and from thence to and through the dielectric heater in one pass.

17. A process for producing hardened clay products as claimed in claim 13 wherein adjustment of the dielectric heating circuit is further controlled by adjustment of the distance between the upper and lower electrodes.

18. A process for producing hardened clay products as claimed in claim 13 wherein the modules being passed through the dielectric heater are treated with dielectric heating current directed through the modules in multiple directions by utilizing an upper electrode comprising a plurality of electrode elements tilted in different directions.

References Cited by the Examiner

UNITED STATES PATENTS

| 1,808,762 | 6/1931 | Brund et al. | |
|---|---|---|---|
| 2,281,184 | 4/1942 | Dykstra et al. | |
| 2,454,708 | 11/1948 | Middleton. | |
| 2,643,434 | 6/1953 | Scharf | 264—27 |

FOREIGN PATENTS 517,798  2/1940  Great Britain.

ROBERT F. WHITE, *Primary Examiner.*

ALFRED L. LEAVITT, *Examiner.*

J. A. FINLAYSON, *Assistant Examiner.*